United States Patent [19]

Omura

[11] 3,918,048

[45] Nov. 4, 1975

[54] APPARATUS FOR TESTING THE RESOLUTION OF AN ANALOG TO DIGITAL CONVERTER

[75] Inventor: Glen I. Omura, Sun Valley, Calif.

[73] Assignee: The United States of America as represented by the Secretary of the Navy, Washington, D.C.

[22] Filed: Apr. 15, 1974

[21] Appl. No.: 460,856

[52] U.S. Cl. .... 340/347 AD; 340/347 CC; 324/73 R

[51] Int. Cl.[2] .......... H03K 13/00

[58] Field of Search .......... 340/347 AD, 347 CC; 324/73 R; 325/363

[56] References Cited

UNITED STATES PATENTS

| | | | |
|---|---|---|---|
| 2,963,697 | 12/1960 | Giel | 340/347 CC |
| 3,177,482 | 4/1965 | Chase | 340/347 |
| 3,537,099 | 10/1970 | Johansson | 340/347 |
| 3,710,376 | 1/1973 | Fluegel | 340/347 CC |
| 3,737,891 | 6/1973 | Metcalf | 340/347 CC |

*Primary Examiner*—Malcolm A. Morrison
*Assistant Examiner*—Vincent J. Sunderdick
*Attorney, Agent, or Firm*—Richard S. Sciascia; Paul N. Critchlow

[57] ABSTRACT

An oscillator provides an $f_1v_1$ analog signal to a summing amplifier. The same oscillator signal is conducted through a frequency multiplier and voltage attenuator to produce an $f_2v_2$ signal also applied to the summing amplifier. The amplifier output is converted to digital signal samples by the analog to digital (A/D) converter to be tested and a computer counts the number of $f_2$ samples in an $f_1$ sample. By comparing received $f_2$ samples with the expected $f_2$ samples, resolution is determined.

7 Claims, 4 Drawing Figures

APPARATUS FOR TESTING THE RESOLUTION OF AN ANALOG TO DIGITAL CONVERTER

BACKGROUND OF THE INVENTION

The present invention relates to A/D converters and, in particular, to apparatus and methods for testing the performance of such converters.

Although a number of performance tests are performed on A/D converters, the present concern is with resolution testing, or, in other words, with determinations of whether the minimum voltage which, according to ratings or specifications, is capable of being converted into a recognizable digital equivalent, actually is being converted by the particular converter under test. In addition, it also may be desired to determine the resolution of the converter along its entire dynamic range or, in fact, at any particular voltage within the range. Accordingly, by the present definition, resolution includes all such performance characteristics.

At the present time, the most commonly used method for determining resolution is to employ a laboratory standard voltage source which provides resolution data by comparing the output of the converter with the known input. Although this conventional method may be satisfactory in some laboratory testing situations, difficulties arise when it is desired either to test the full dynamic range of the converter or to test the converter after it has been installed for use in an aircraft, helicopter, ship or the like. For example, the U.S. Navy employs certain ASW equipment including an aircraft-mounted magnetometer used to detect the magnetic field generated by a submarine. A/D converters are employed with this equipment for digitizing the analog information received by the magnetometer. Obviously, such a converter must have exceptionally high resolution over a large dynamic range since, as will be apparent, the analog information applied to the converter will in most instances be relatively minute. The A/D converter used with this equipment will have a certain rated resolution capability and, to some extent, this capability can be tested or checked in the laboratory before installation in the aircraft. However, once the converter is installed in the aircraft, its resolution should be rechecked not only after the initial installation but also on a periodic basis. As is known aircraft installations may effect the operation of electroniic equipment because the equipment then is subjected to varying temperature conditions, vibrations, humidity and, in particular, electromagnetic interference from surrounding equipment. For this purpose, it not only is desirable to provide equipment or apparatus for testing the converter in situ but, in addition, to provide the apparatus as a 'built in' unit capable of conducting resolution tests at, for example, the throw of a switch. The use of conventional laboratory standard voltage sources clearly would be unnecessarily laborious and time-consuming. Also, as far as is known, other A/D converter test equipment is equally impractical due to the relatively complex and expensive nature of the equipment. As has been stated, most of the other test equipment simply is not intended or designed for testing converter resolution.

OBJECTS OF THE INVENTION

The primary object of the present invention is to provide apparatus for testing A/D converter resolution, the apparatus being simple, inexpensive, accurate, reliable and relatively fast in its operation.

Another important object is to provide resolution testing apparatus that is capable of being built into existing systems to permit the testing of installed converters in a quick and easy manner.

A further object is to provide test equipment capable of being easily built into existing systems to permit testing of the converter periodically as a regular maintenance check.

BRIEF DESCRIPTION OF THE DRAWINGS

The present invention is illustrated in the accompanying drawings of which.

DETAILED DESCRIPTION OF THE INVENTION

Figure 1:
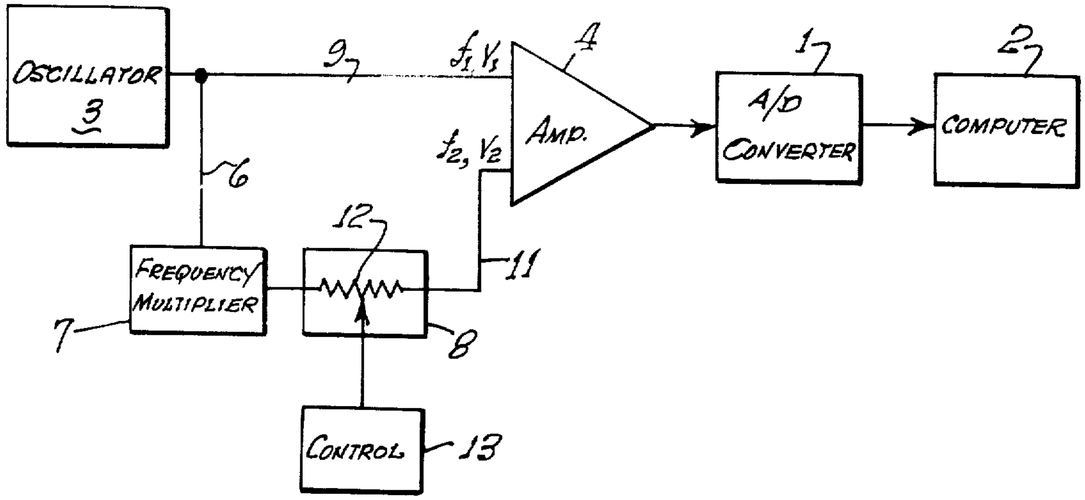
FIG. 1 is a block diagram illustrating the various components used in testing the resolution an A/D converter used to provide digitized signals to a computer.

Referring to FIG. 1, the A/D converter to be tested is represented by block 1, this converter applying binary digital signals or samples to a computer 2. Most computers, of course, have the capability of providing a count of the digitized input and, in the presently illustrated apparatus, it is assumed that computer 2 has this capability. If not, the capability very simply can be added in various conventional and well-known manners. As will become apparent, the ability of computer 2 to provide a count of the digitized input signals is an essential to the determination of the A/D converter resolution.

The test apparatus illustrated in FIG. 1 includes an oscillator 3, a summing amplifier 4 and a circuit 6 conducting the oscillator output first to a frequency multiplier 7 and then to a voltage attenuator 8. As shown, the oscillator output is applied directly to summing amplifier 4 through conductor 9 and the multiplied and attenuated output of the oscillator also is applied to summing amplifier 4 through conductor 11. Again, these are conventional components that can be provided in known manners. Attenuator 8 most suitably is in the form of a potentiometer 12 which can be manually-varied by a control 13 to produce accurate attenuations of the oscillator voltage over, preferably, the entire dynamic range of the A/D converter.

Figure 2:
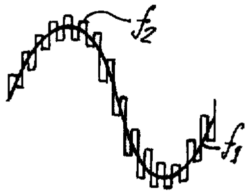
FIGS. 2 and 3 are waveforms illustrating two possible inputs into the A/D converter.
Figure 3:
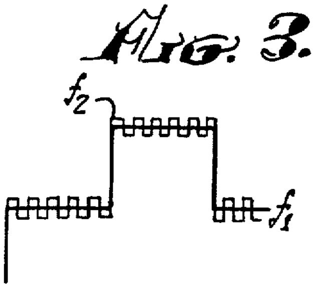

As further illustrated in FIG. 1, the output of oscillator 3 applied directly to the summing amplifier has a known predetermined frequency and voltage ($f_1 v_1$). The other input to the summing amplifier which has been frequency-modified and attenuated is designated $f_2 v_2$. These two analog signals are then summed by amplifier 4 to produce outputs such as are shown in FIGS. 2 and 3. As indicated by FIGS. 2 and 3, the oscillator output $f_1$ can be a sine wave or a square wave or, if desired, other waveforms, such as a triangular wave, could be employed. When a square wave, such as is shown in FIG. 3, is used, the resolution of the A/D converter will be made at the maximum level of the signal.

To determine the resolution of A/D converter 1, the summing amplifier output is applied to the converter and a count is made by the computer of the number of $f_2$ components in an $f_1$ sample. If the number of the $f_2$ components in the sample is that multiple or is close to the expected multiple, it then is apparent that the A/D converter resolves to the $v_2$ voltage resolution. More simply, the A/D converter converts each $f_2$ waveform as shown in FIG. 2 and 3 into a digital sample and the number of these $f_2$ samples and the $f_1$ waveform on FIGS. 2 and 3 is used to determine resolution.

Such a count can be achieved only if the two signals ($f_1v_1$ and $f_2v_2$) are in phase and it is for this purpose that a single oscillator 3 is employed. While it might be possible to provide a pair of oscillators to produce the $f_1v_1$ and $f_2v_2$ signals for the summing amplifier, such an arrangement is not considered practical since it would be complicated by the need to phase-lock the oscillators.

As has been indicated, the final computation of the A/D converter resolution is accomplished by comparing the computer count with known data. Customarily, the resolution capability of the A/D converter is provided in the converter specifications and, if desired, the computer count can be compared with these specifications. Also, the count can be compared with results obtained in a laboratory test of the converter such, for example, as a test conducted with the conventional laboratory standard signal voltage.

Figure 4:
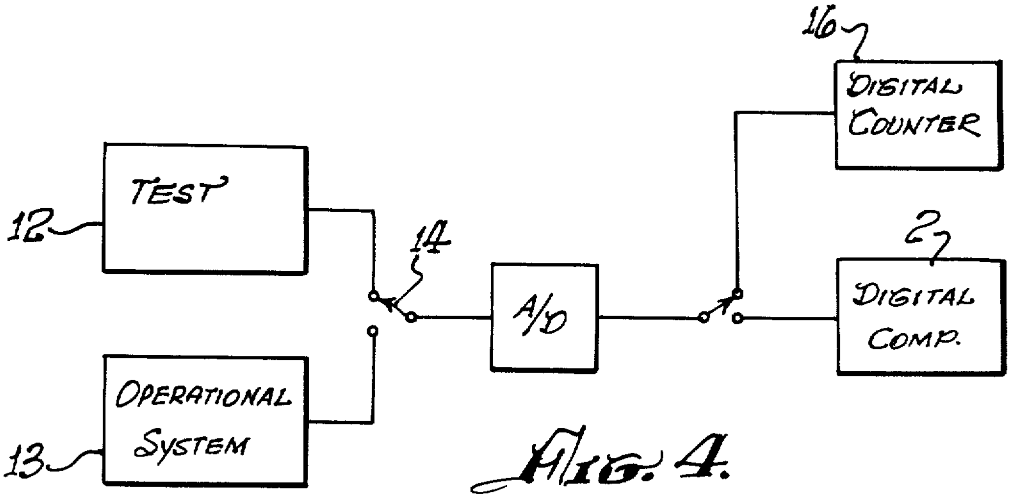
FIG. 4 is another block diagram illustrating the manner in which the present apparatus is built-into an existing system.

It also should be recognized that the present test equipment can be provided either as a separate unit adapted to be coupled to A/D converter, or it can be built into the system. FIG. 4 is intended to illustrate the manner in which the test apparatus can be built into the system. Referring to FIG. 4, it will be recognized that block 12 is intended to include such components as oscillator 3, summing amplifier 4 and the frequency and voltage modifying circuits which produces $f_2v_2$. Block 13 is intended to represent the input from the system itself which, employing the example previously mentioned might be the input of a magnetometer used in an ASW search. Switch 14 is used to simply couple either the test equipment or the system input to A/D converter 1.

Although the foregoing description has defined certain particular components, it will be apparent that other functionally-equivalent components can be substituted. For example, instead of using the frequency multiplier of block 7, a frequency divider could be substituted and amplitude attenuation accomplished on line 9. Further, potentiometer control can be performed either manually as illustrated or, if desired, a stepped motor could be used to progressively vary $v_2$ voltage over the range in which resolution is to be tested. Also, if the digital computer illustrated in FIG. 1 does not have the ready capability of providing the necessary count of the $f_2$ components, a simple, unsophisticated digital counter 16 can be used and a switch 17 provided to couple counter 16 to the A/D converter output during testing procedures.

Obviously many modifications and variations of the present invention are possible in the light of the above teachings. It is therefore to be understood that within the scope of the appended claims the invention may be practiced otherwise than as specifically described.

I claim:

1. Apparatus for testing the resolution of an analog to digital converter comprising:
   - a signal source means providing an analog signal having a predetermined frequency and voltage ($f_1v_1$),
   - a voltage summing amplifier having first and second inputs, said first input being directly coupled to said signal source means,
   - electrical circuit means coupling said signal source means to said second amplifier input, said circuit including:
     - frequency modifying means, and
     - voltage-modifying means,
   - whereby a second analog signal ($f_2v_2$) is summed with said $f_1v_1$ signal in said summing amplifier, and
   - an analog to digital converter having an input coupled to said amplifier output for producing in-phase digital samples representative of the $f_1v_1$ and $f_2v_2$ analog signals,
   - whereby resolution at said $v_2$ voltage can be determined by digitally counting the number of $f_2$ samples in an $f_1$ sample and comparing the count with known resolution data.

2. The apparatus of claim 1 wherein said voltage-modifying means is a potentiometer.

3. The apparatus of claim 1 wherein said signal source means is an oscillator.

4. The apparatus of claim 3 wherein said frequency-modifying means is a frequency multiplier.

5. The apparatus of claim 3 wherein said frequency-modifying means is a frequency-divider.

6. The apparatus of claim 1 wherein said voltage-modifying means is adjustable to successively test the converter resolution at a plurality of $v_2$ voltages.

7. The apparatus of claim 6 further including a digital computer means adapted to be coupled to the output of said A/D converter for counting the $f_2$ samples produced by said plurality of $v_2$ voltages.

* * * * *